(12) United States Patent
Lipik

(10) Patent No.: US 10,788,735 B2
(45) Date of Patent: Sep. 29, 2020

(54) SCANNER, SPECIFICALLY FOR SCANNING ANTIQUE BOOKS, AND A METHOD OF SCANNING

(71) Applicant: Jacek Lipik, Jerzmanowice (PL)

(72) Inventor: Jacek Lipik, Jerzmanowice (PL)

( * ) Notice: Subject to any disclaimer, the term of this patent is extended or adjusted under 35 U.S.C. 154(b) by 0 days.

(21) Appl. No.: 16/366,555

(22) Filed: Mar. 27, 2019

(65) Prior Publication Data

US 2019/0219902 A1 Jul. 18, 2019

Related U.S. Application Data

(63) Continuation of application No. PCT/PL2017/000092, filed on Sep. 25, 2017.

(30) Foreign Application Priority Data

Sep. 28, 2016 (PL) .................................. 418907

(51) Int. Cl.
*G03B 17/56* (2006.01)
*H04N 1/14* (2006.01)
*G03B 15/00* (2006.01)

(52) U.S. Cl.
CPC ............ *G03B 17/561* (2013.01); *G03B 15/00* (2013.01); *H04N 1/14* (2013.01); *H04N 2201/043* (2013.01); *H04N 2201/0434* (2013.01)

(58) Field of Classification Search
CPC .......... G06K 9/00302; H04N 5/23219; H04N 7/183; H04N 5/06; H04N 5/08; H04N 7/181; H04N 5/247; H04N 5/2256; H04N 5/23206; H04N 5/23238; H04N 5/2354; H04N 1/3875; H04N 5/2224; H04N 5/23212; H04N 5/23293; H04N 5/2628;
(Continued)

(56) References Cited

U.S. PATENT DOCUMENTS 3,724,948 A   4/1973   Wally, Jr. et al.
4,567,528 A   1/1986   Wilman et al.
(Continued)

FOREIGN PATENT DOCUMENTS

DE          82 07 305 U1    1/1983
DE   10 2004 058 769 A1    6/2006
(Continued)

OTHER PUBLICATIONS

International Search Report issued for corresponding International Patent Application No. PCT/PL2017/000092, dated Feb. 8, 2018.

*Primary Examiner* — Negussie Worku
(74) *Attorney, Agent, or Firm* — Myers Wolin, LLC

(57) ABSTRACT

A scanner, specifically for scanning antique books, comprising a beam to which is attached a slide bearing guide and a stepper motor connected to a transmission, wherein to the opposite end of the beam a similar bearing-supported freely rotating gear is attached, wherein between the said gears runs a toothed belt two ends of which are attached to slide bearing, to which guide and motor are attached with a connector in-between, wherein motor is linked to a screw by means of a toothed belt. A method of scanning antique books consists in moving a linear camera over the scanned book in three axes, travelling over the scanned object (a), travelling along the vertical axis (b) and rotating around its axis (c).

4 Claims, 11 Drawing Sheets

(58) Field of Classification Search
CPC .. H04N 13/243; H04N 5/2253; H04N 5/2251; H04N 5/2258; H04N 5/232; H04N 5/23296; H04N 5/2351; H04N 5/2352; H04N 7/185; G06T 1/00; G06F 1/1694; G06F 21/32; G06F 3/0346; G06F 3/04812
USPC .......................................... 358/474, 497, 496
See application file for complete search history.

(56) References Cited

U.S. PATENT DOCUMENTS

| | | | | |
|---|---|---|---|---|
| 5,751,444 | A * | 5/1998 | Ward | H04N 1/0311 358/471 |
| 9,635,211 | B2 * | 4/2017 | Iwayama | H04N 1/04 |
| 2004/0009092 | A1 * | 1/2004 | Diaferia | A01M 19/00 422/21 |
| 2006/0243798 | A1 * | 11/2006 | Kundu | G07F 17/3241 235/383 |
| 2009/0180085 | A1 * | 7/2009 | Rieck | G03B 27/52 355/25 |
| 2009/0219580 | A1 * | 9/2009 | Cornell | H04N 1/0035 358/474 |
| 2011/0197259 | A1 * | 8/2011 | Thibadeau | G06F 21/84 726/2 |
| 2011/0222757 | A1 * | 9/2011 | Yeatman, Jr. | H04N 13/239 382/154 |
| 2015/0069123 | A1 * | 3/2015 | Thompson | G06K 7/0095 235/438 |
| 2017/0078514 | A1 | 3/2017 | Iwayama et al. | |
| 2018/0077345 | A1 * | 3/2018 | Yee | H04N 5/23206 |
| 2018/0123793 | A1 * | 5/2018 | Thibadeau, Sr. | H04L 9/3263 |
| 2018/0314863 | A1 * | 11/2018 | Gao | G01G 19/4144 |
| 2018/0365544 | A1 * | 12/2018 | Gao | G06K 7/10722 |
| 2019/0033459 | A1 * | 1/2019 | Tisdale | G01S 17/89 |
| 2019/0258870 | A1 * | 8/2019 | Kundu | G06K 9/00718 |

FOREIGN PATENT DOCUMENTS

| | | |
|---|---|---|
| GB | 2 287 546 A | 9/1995 |
| WO | 2016/024348 A1 | 4/2017 |

* cited by examiner

SCANNER, SPECIFICALLY FOR SCANNING ANTIQUE BOOKS, AND A METHOD OF SCANNING

CROSS REFERENCE TO RELATED APPLICATIONS

This application is a continuation under 35 U.S.C. § 120 of International Application PCT/PL2017/000092, filed Sep. 25, 2017, which claims priority to Polish Application No. P.418907, filed Sep. 28, 2016, the contents of each of which are incorporated by reference herein.

The present solution relates to a scanner, specifically to one for scanning antique books, and to a method of scanning

BACKGROUND

Specialized book scanners, such as Zeutchel 12002v, and the so-called book cradles that hold the book in an open position, are used for scanning of antique books with wide stitching margins or with limited opening angles. The scanners of this type, equipped with a book cradle, enable opening the halves of a stitch bound antique book to a right or obtuse angle. In devices of this type the book is set in a place, its position is determined by means of a laser rangefinder, and two opposite pages of the book are held in place during scanning by means of a transparent pressure plate, and both pages are scanned from top to bottom by means of a linear scanner.

The UK patent application GB 2287546 and the German utility model specification DE8207305 describe a device for reproducing books, wherein the device includes a table and a camera positioned above the table, wherein a fully open book is pressed with a glass cover, and wherein in order to compensate for the difference in the thickness of the halves of the open book the book is supported from below by a set of two supporting surfaces of individually adjustable height matching the thickness of each half of the book. In case of antique books such wide opening of the book and the pressure exerted by the glass cover are highly undesirable, harmful or even destructive. On the other hand, if there is no pressure on the book, or if such pressure is low, the image of the scanned book may look like the one shown in FIG. 10.

The German patent application DEI 02004058769 describes a device and method of scanning documents, wherein the device is equipped with a frame and a movable camera. The device also has a photosensitive sensor and an optical system with mirrors that can take one of two positions. The method of scanning an original document with the mobile camera module comprises the following steps: in the first position first section of document is imaged on a sensor via the first optical path and in the second position second section of a document is imaged on the sensor via the second optical path. These sections overlap. However, in this method the proportions are not retained, and the width of the image changes with a distance. Scanning is carried out at a constant angle.

SUMMARY

The essence of the present solution is a scanner, in particular for scanning antique books, comprising a housing, a frame, a camera moving on a guide along a scanned object attached to positioning mechanisms in the form of slide beams, belts and gears and motors. A slide bearing guide and a horizontal movement stepper motor are attached to the beam, the stepper motor connected to a transmission, preferably in the form of a gear (toothed wheel). To the opposite end of the beam a similar bearing-supported freely rotating gear is attached between which a toothed belt runs. Ends of the belt are secured to the slide bearing to which a guide and a vertical movement motor are attached with a connector in-between, the vertical movement motor being connected to a screw by means of a toothed belt. The screw that partakes in the vertical movement of the camera is connected to a connector to which slide shafts and the camera and the motor are attached. In the said connector a shaft is set in a bearing, wherein to one end of the said shaft the camera is attached, and to the opposite end of the said shaft a rotational movement stepped motor is attached.

A method of scanning antique books by moving a linear camera over the scanned book at the desired speed, dependent on the desired image resolution, depends on that that a linear camera moves along three axes, travelling over the scanned object, moving along the vertical axis and rotating around its axis. The movement of the linear camera is determined by a trajectory set beforehand or during scanning by means of a device that determines the distance between the camera and the surface of the book. This movement is preferably constant in relation to the scanned area of the object, whereas in zones where the scan is obscured by the other, convex part of the book, and where guiding the camera at a right angle is impossible, the linear camera changes the scanning direction and angle, maintaining the latter as close to a right angle as possible. Therefore, in such object scanning areas the camera stops and changes its movement direction to opposite, changes its scanning angle maintaining it as close to a right angle as possible while scanning the present and subsequent page. When the ability to orient the camera perpendicularly to the scanned object is regained, the camera movement direction is changed again to opposite and scanning of the second page is continued until the edge of the scanned page is reached.

Scanning antique books requires a specific approach and the use of solutions that minimally interfere with the scanned object. Valuable and very old documents are often stitch bound or creased. Less critical parameters of the process include scanning speed and mechanical complexity of the device, while the more critical include quality and contactless nature of the process. The scanner, irrespective of the arrangement of the scanned object, allows guiding the linear camera at a right or very close to a right angle and at a constant distance to the surface of the region of the object being scanned at the given moment. The region of the object being scanned at the given moment is a rectangular section of the object (with a width of a pixel at the set resolution) subjected to digitization, that is mapping of the analog image of the object in digital form. With this scanning method, image distortion and many of the problems of the prior art methods are avoided. The image of the book in the proposed method, where no pressure is exerted on the pages of the book, looks as shown in FIG. 11. Unlike in prior art methods, to obtain a correct image without distortion there is no need to open the book fully. The opening angle of the object, the book, is confined only by camera accessibility, and it may be less than 90 degrees and different for each part of the book. Pressing the book with a glass panel is not required, either. No electronic flattening or corrective image processing is applied to achieve a correct image with no distortion. Likewise, no changing of the focal length of the lens is applied to correct the picture and obtain a correct and undistorted image. The image is created by one camera, thereby problems with calibrating several cameras and assembling the entire image are avoided.

BRIEF DESCRIPTION OF THE DRAWINGS

The subject of the solution is illustrated by an embodiment shown in drawings.

DETAILED DESCRIPTION

Figure 1:
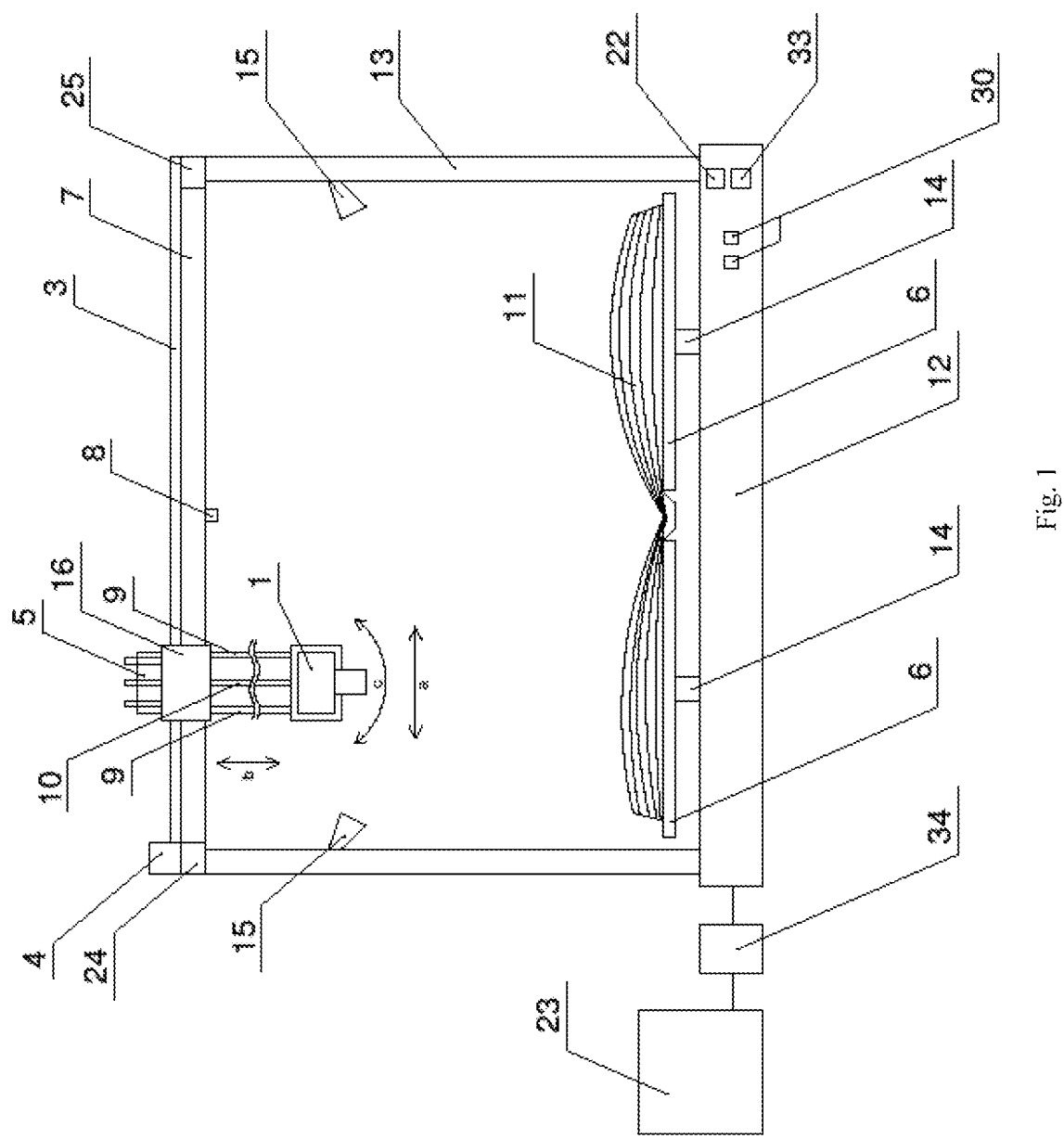
FIG. 1 shows a front view of the scanner.
Figure 2:
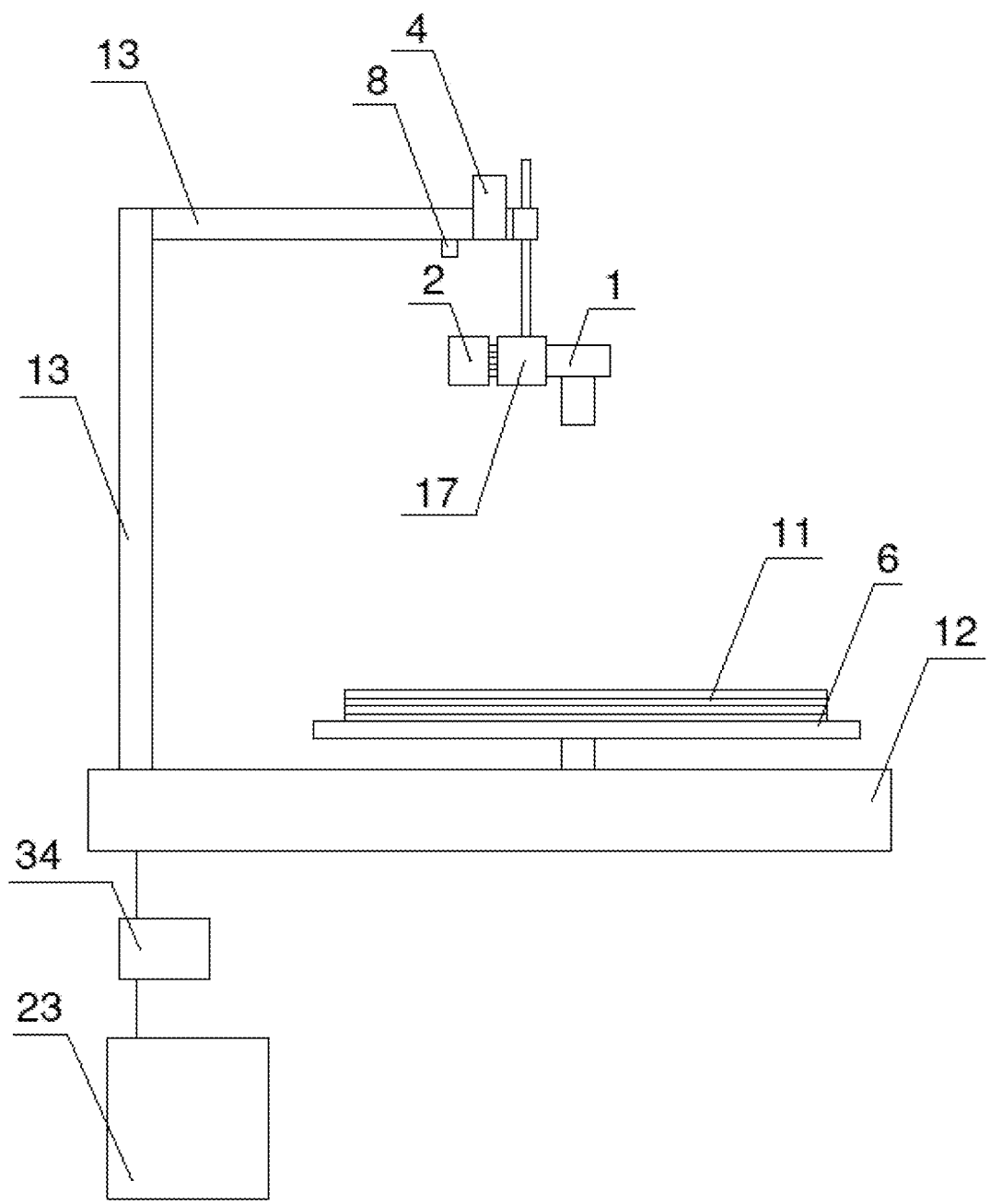
FIG. 2 shows a side view of the scanner.
Figure 3:
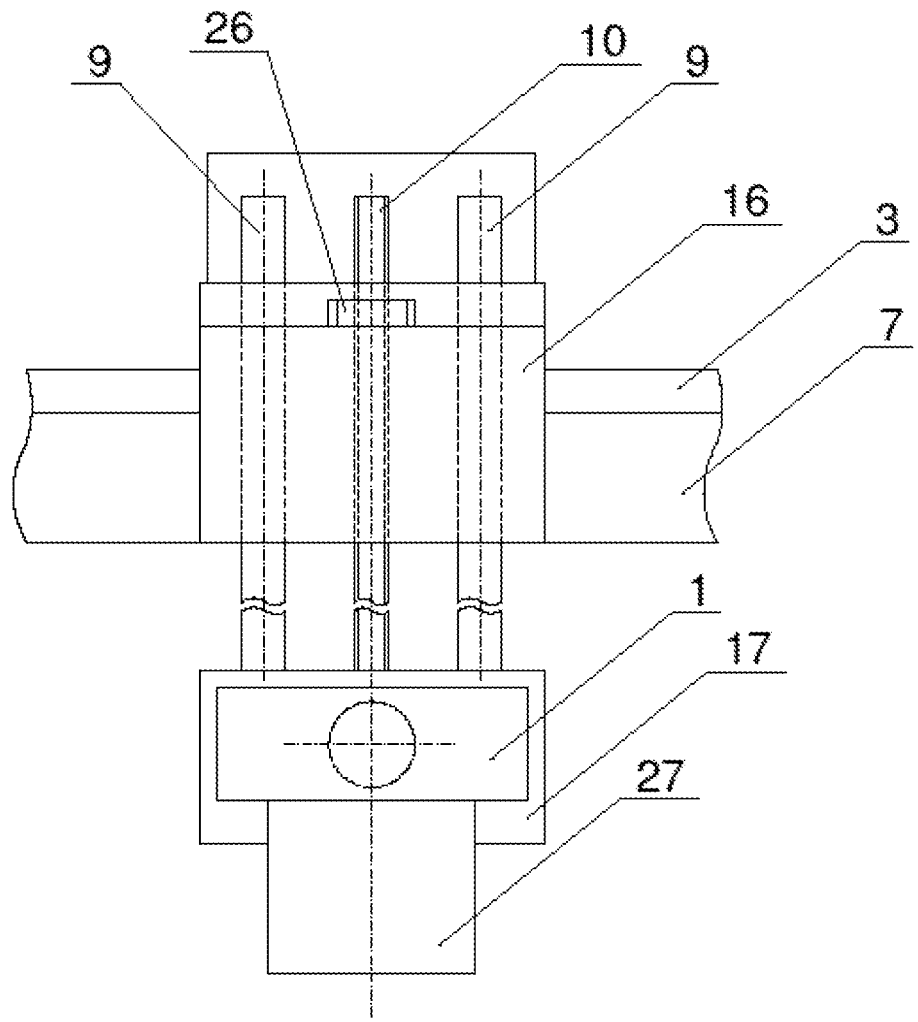
FIG. 3 shows a front view of the lowering mechanism of the camera.
Figure 4:
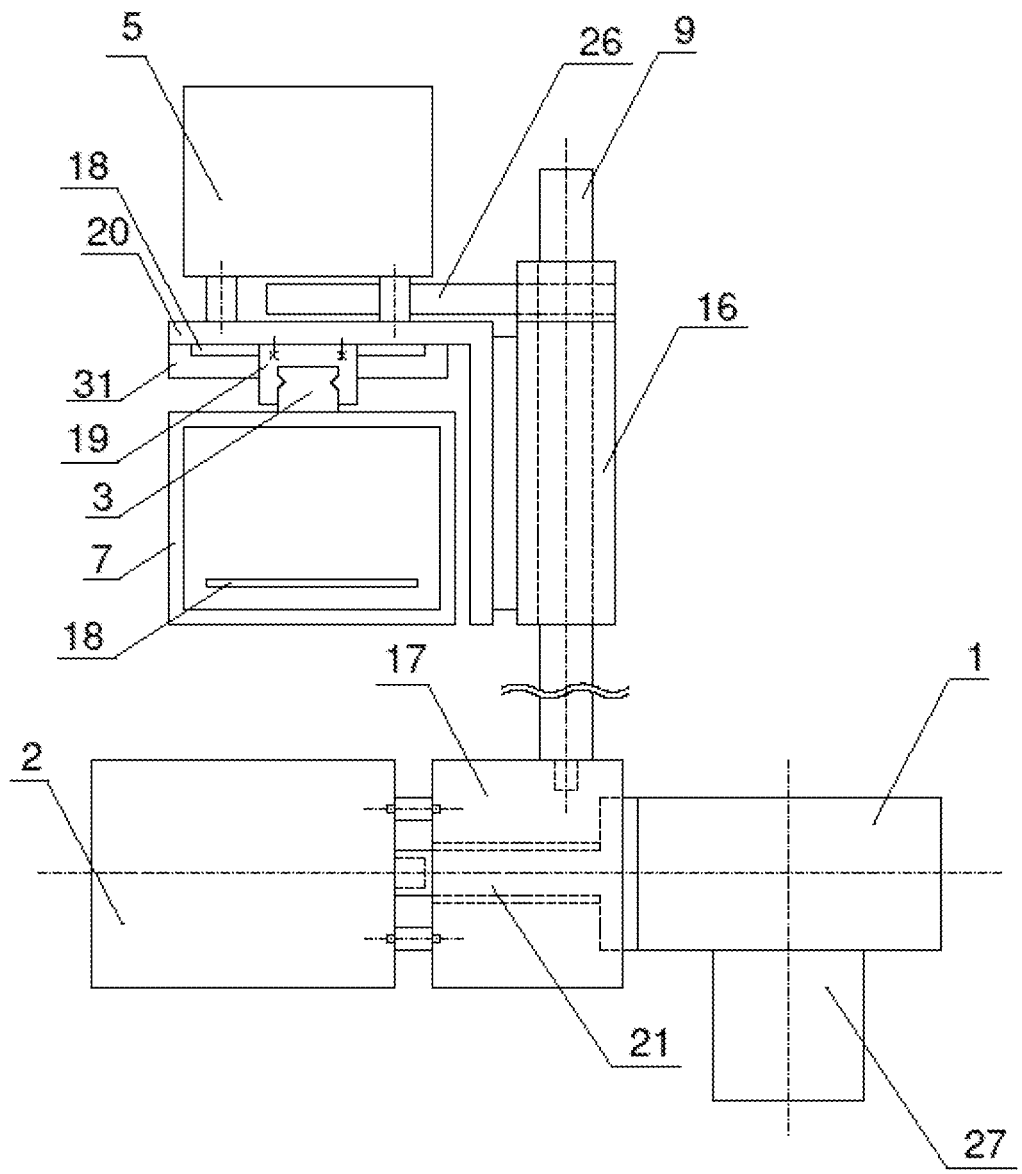
FIG. 4 shows a side view of the mechanism of lowering and moving the camera.
Figure 5:
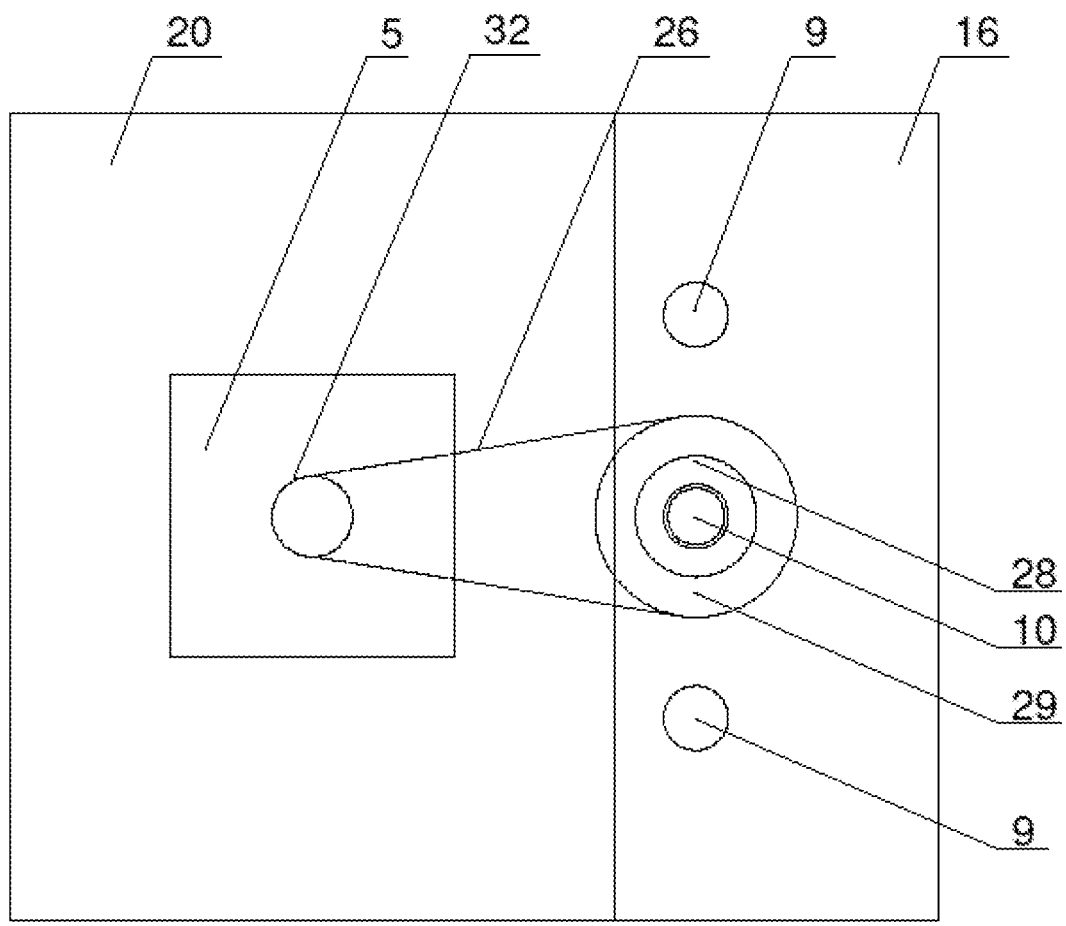
FIG. 5 shows a top view of the mechanism of lowering the camera.
Figure 6:
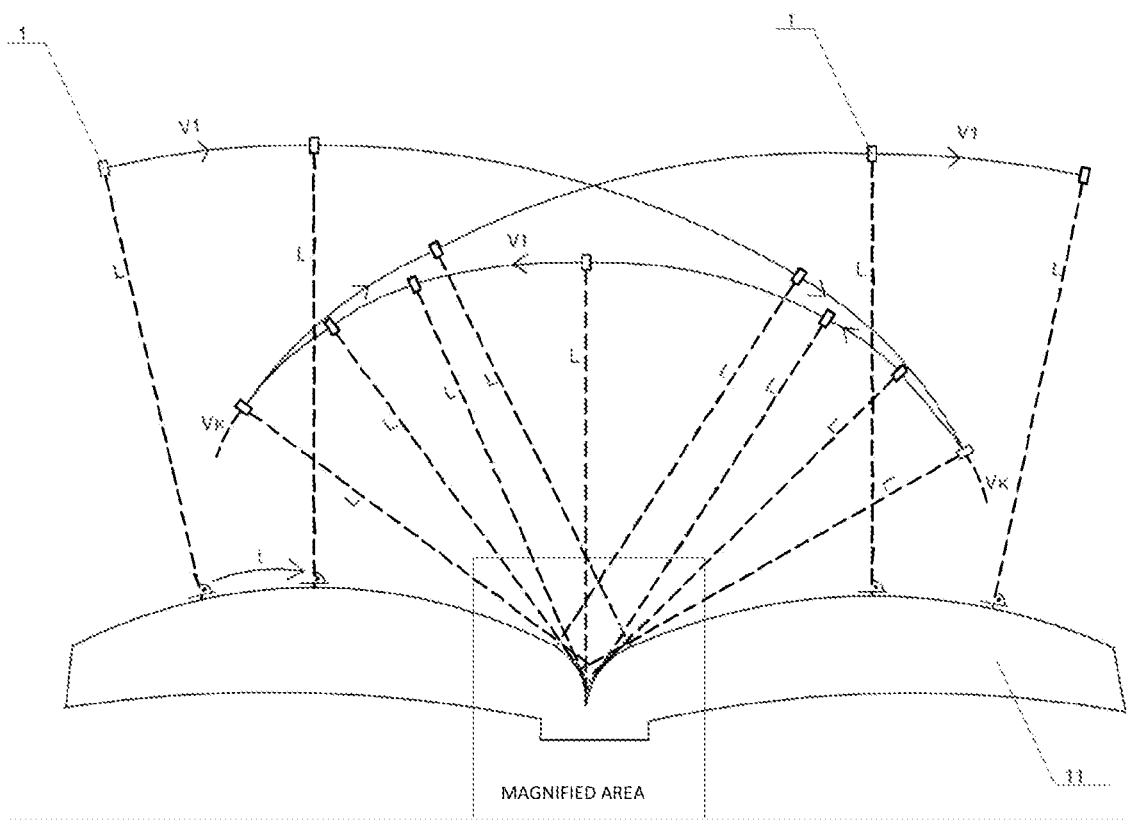
FIG. 6 shows a diagram of camera movement when the book is open at an angle of 180 degrees.

The scanner has a scanner housing 12 to which frame 13 is attached. The housing houses a mechanism for lifting and lowering two platens 6, left and right, on which the scanned object 11 rests. The movement of both halves is effected by means of guides 14 controlled by pushbuttons 30. Beam 7 is attached to the frame 13. A slide bearing 19 guide 3 and a stepper motor 4 are attached to the beam 7, the stepper motor 4 driving gear (toothed wheel) 24 via a transmission. To the opposite end of the beam 7 a bearing-supported freely rotating low speed gear 25 is attached. A toothed belt 18 is stretched between gears 24 and 25, the two ends of the toothed belt being attached to connector 20 by means of bracket 31. The slide bearing 19 moves on guide 3. The connector 20 is attached to the slide bearing 19. A guide 16 for lifting and lowering the linear camera 1 and a stepper motor 5 for driving a screw 10 via a toothed belt 26 are attached to connector 20. The motor 5, through the medium of the toothed belt 26, rotates a nut 28 installed in gear 29. When the nut 28 rotates, it lifts or lowers (depending on the sense of rotation) the screw 10. The screw 10 is attached to connector 17, to which slide shafts 9 and linear camera 1 with lens 27 and motor 2 are also attached. The purpose of the slide shafts 9, the bearings of which are installed in guide 16, is to stabilize the movement forced by screw 10. The connector 17 houses a bearing for shaft 21, to one end of which is attached the linear camera 1 with lens 27, and to the other end of which is attached motor 2.

Computer 23 controls are attached to longitudinal movement motor 4, to up-down movement motor 5 and to camera rotation motor 2. The controls 23 are also connected to lamps 15 which are turned on only during scanning to rangefinder 8 of the linear camera 1.

The area of scanning and scanning resolution are set in the first place. The area of scanning is set either by selecting from a list a standardized format, e.g. ISO, or by marking the area on a preliminary low resolution high speed scan.

Within the indicated area of scanning an instrument for determining the scanning distance—a rangefinder, a distance meter, for instance a laser rangefinder 8, measures the distance between the object being scanned and the linear camera 1 along the entire length and width of the object being scanned. The rangefinder 8 transfers data to computer 23, where appropriate software forms the image of the scanned object 11. The computer software analyses the image obtained and creates a map of curvatures of the scanned object and determines the trajectory of the linear camera 1 by means of motors 2, 4, 5. Motor control signals are transmitted to the motors by means of controller 34.

After image analysis and determination of the trajectory (or the trajectory is generated in real time) the proper scanning of the object 11 commences. The linear camera 1 is positioned at the set distance from the object 11 and at an angle of 90 degrees to the surface of the object. The movement is effected by means of motors 2, 4, 5. The camera starts moving along the scanned object maintaining a constant speed t, constant distance L and constant angle equal to a right angle in relation to the surface of the object at any given moment.

After the entire surface of the object is scanned, usually a single page or two bound pages, motors 2, 4, 5 are stopped. The camera is then positioned at the start of scanning (start of page) or at the end of scanning in case of continuous scanning.

Figure 7:
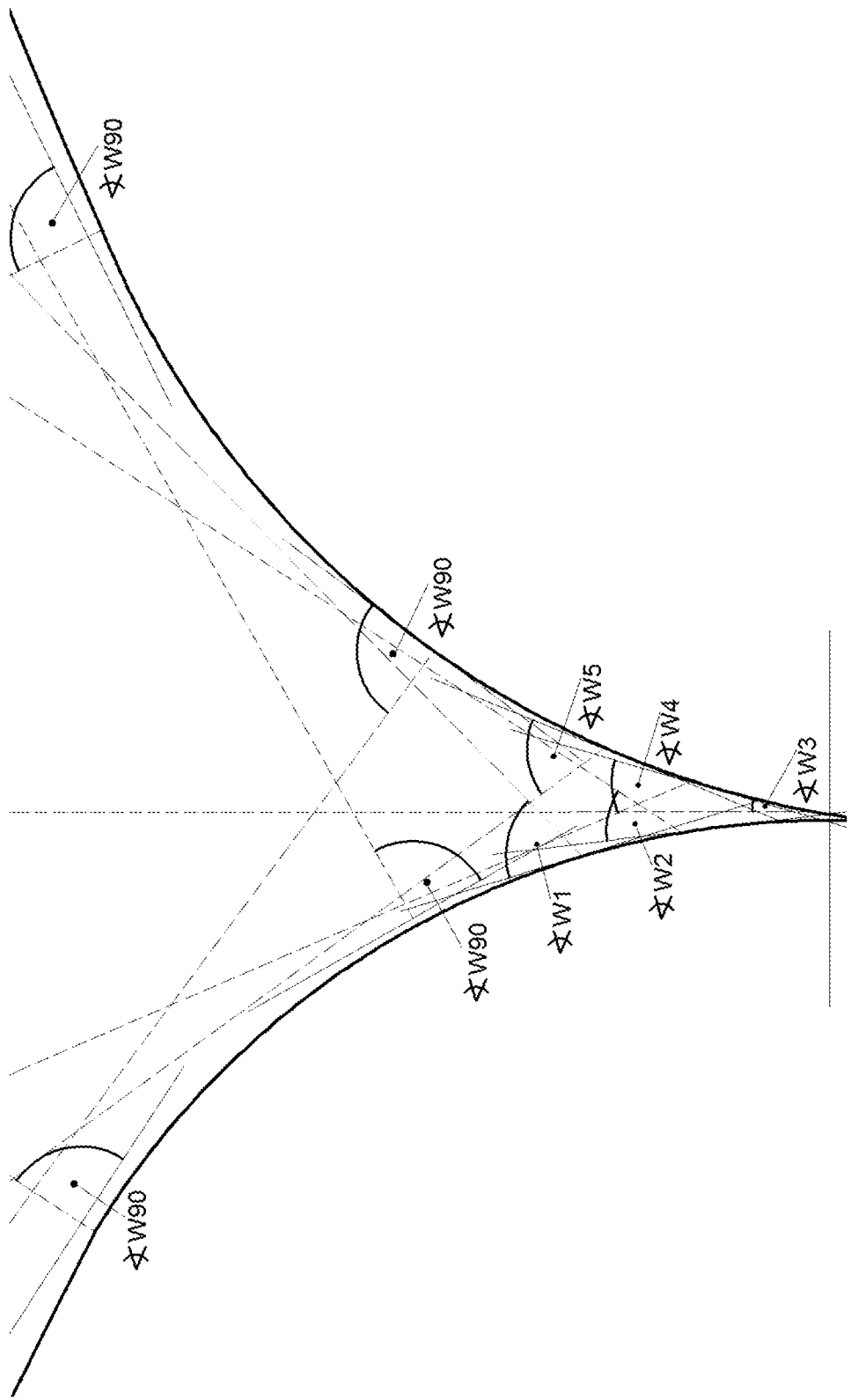
FIG. 7 shows a magnified portion of the diagram of camera movement when the book is open at an angle of 180 degrees.
Figure 8:
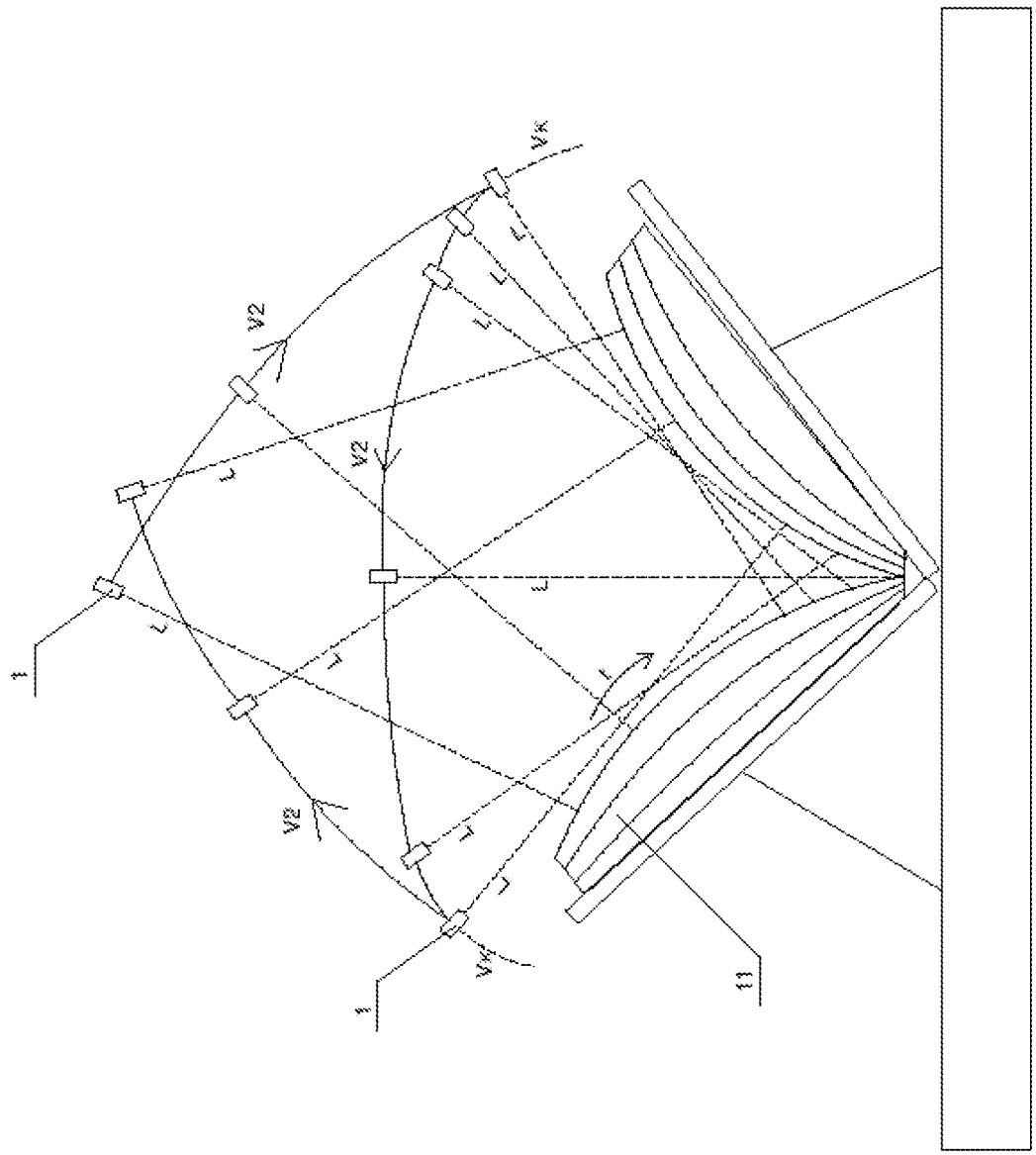
FIG. 8 shows a diagram of camera movement when the book is open at an angle of 90 degrees.
Figure 9:
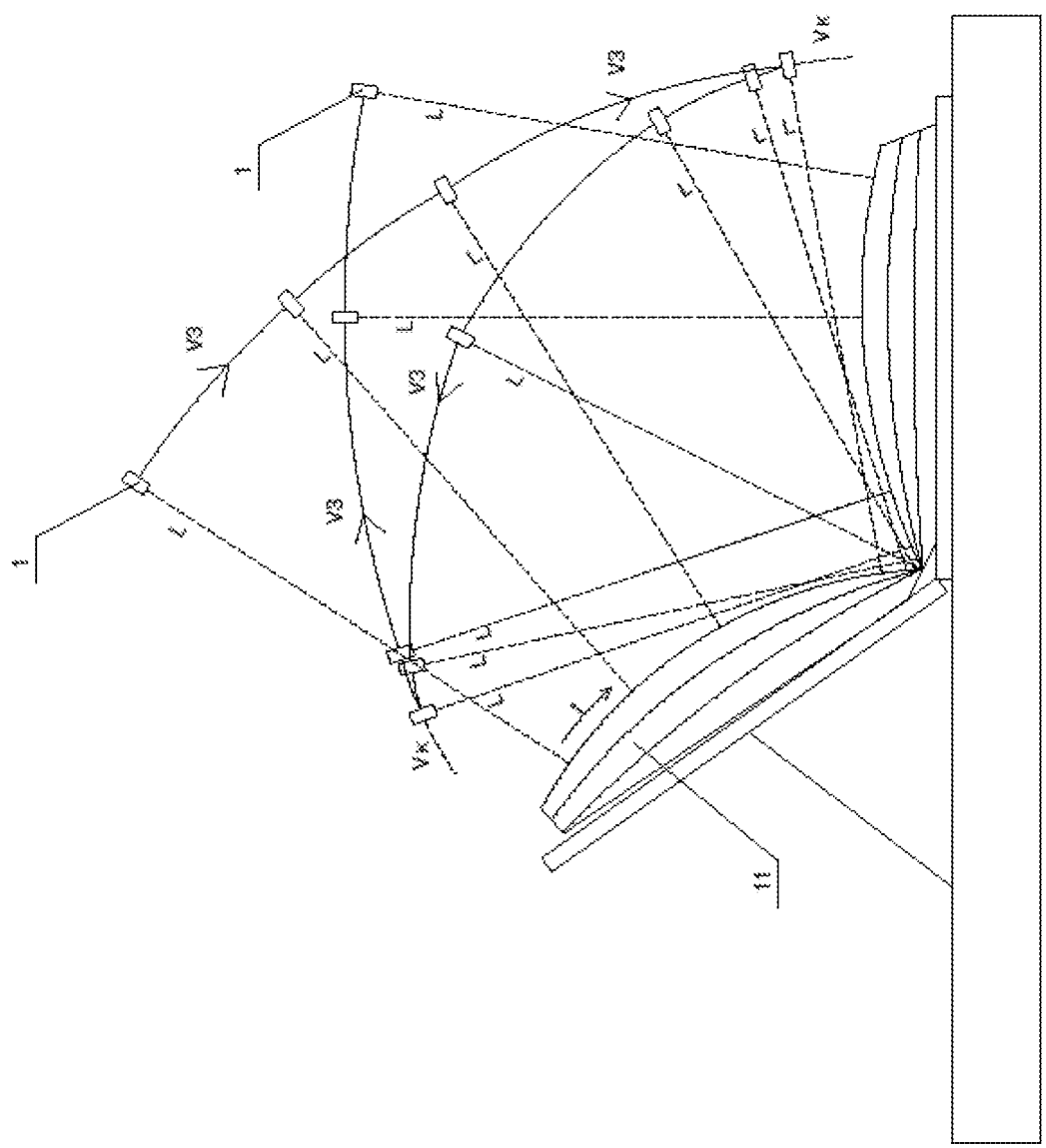
FIG. 9 shows a diagram of camera movement when the book is open at an angle of 120 degrees.
Figure 10:
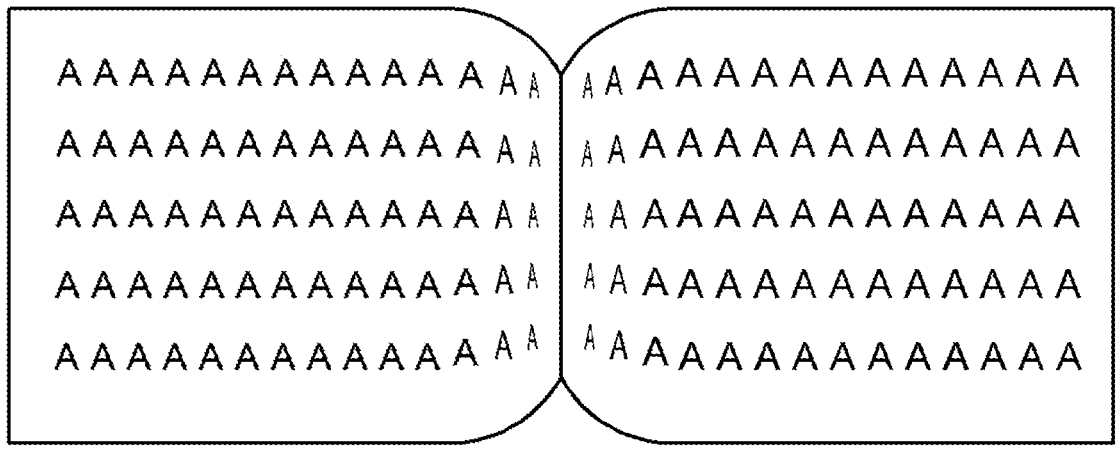
FIG. 10 shows a reproduction of the book in a graphical format obtained using existing (prior art) methods.
Figure 11:
FIG. 11 shows a reproduction of the book in a graphical format obtained using the applicant's method.
Figure 12:
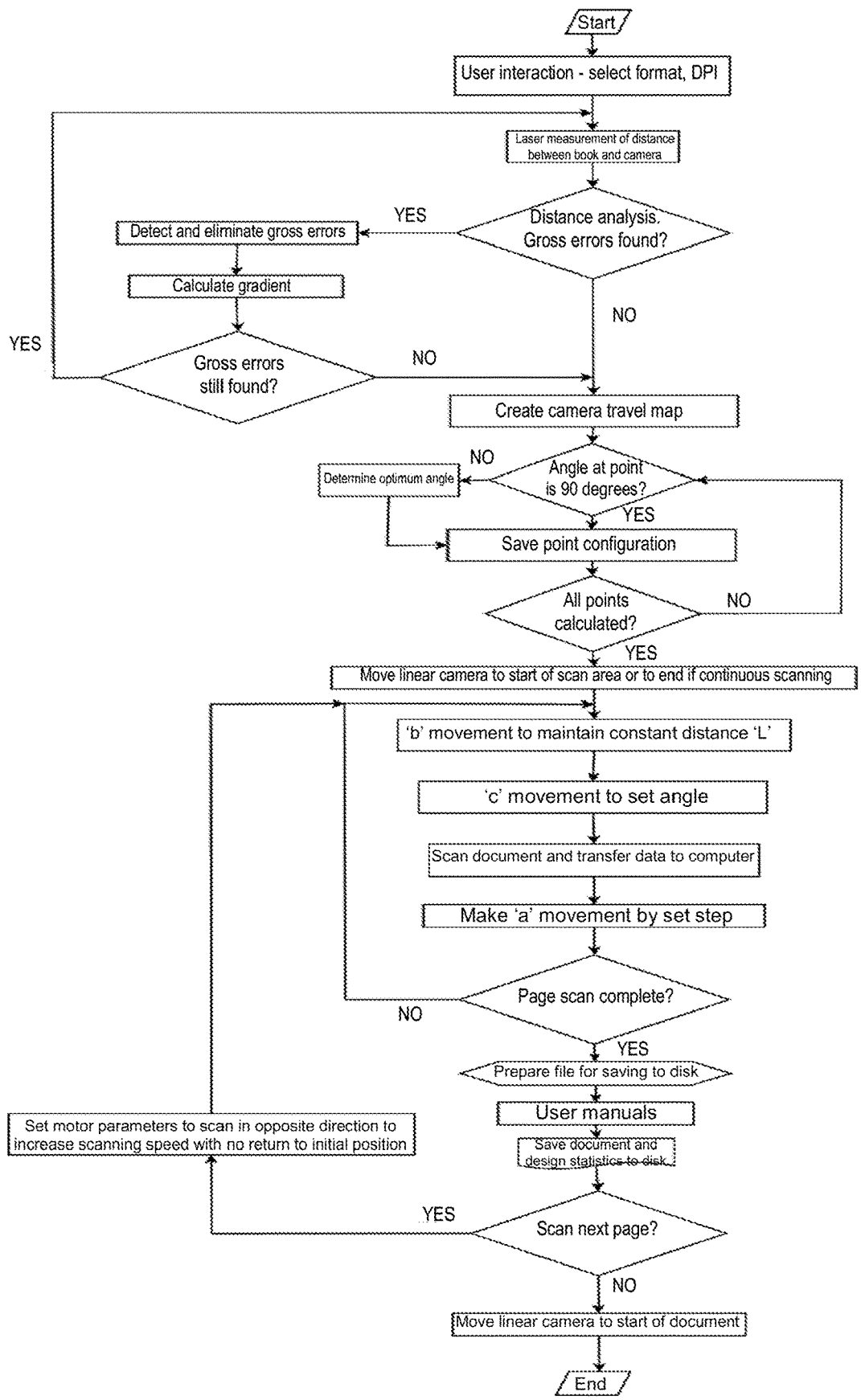
FIG. 12 shows a diagram of operation of the scanner.

However, sometimes the linear camera 1 of the scanner is forced to perform relatively complex movements VI, V2, V3 to obtain a faithful image under much harder conditions. This happens when the book opening angle is small or when the page is creased or bulged. The complexity of the camera movement is illustrated in FIGS. 6, 7, 8, 9. In this case the camera continues to be maintained at a right angle to the scanned object until the rangefinder determines that the distance has decreased drastically. This happens when the light beam of the rangefinder encounters a bulge in the adjacent page that was scanned before or is yet to be scanned. This initiates a change of the camera angle to one that is as close to a right angle as possible and yet enables further scanning of the current page without interference from the adjacent page. This is illustrated in FIG. 7 where angles W1, W2, W3, W4, W5 are smaller than the right angle W90. In other words, when at a given point on the "object map" the camera cannot view the object at an angle of 90 degrees (W90), it stops at section VK and the movement is changed to opposite direction. Controller 34 stops movement of the camera 1 and then changes its direction to the opposite within the VK section so that camera movement is smooth.

In this case, an angle (W1, W2) closest to the right angle is set to maintain the maximum possible perpendicularity to the object. The camera moves to the next page of the object and, like previously, the object is scanned at an angle close to the right angle (W3, W4), and when it becomes possible to attain again the perpendicularity of "camera viewing" of the object (book), the camera movement direction changes again to the opposite along the VK section and scanning of the page is continued until the end of the page is reached. Scanning ends when the end of the map of points is reached. The scanning of the next object starts at the point of termination of the scan of the previous object in continuous operation, otherwise the camera returns to the left edge.

The controller provided with computer software determines the movement of the camera head depending on the changing scanning conditions, opening angle of the book, book bulge, scanning range. Also, the speed and direction of the movement of the camera head over the scanned object (movement a) is determined in each case so that the speed t at the level of the scanned object 11 is constant. This speed is determined by the scanning resolution. The speed and direction of camera head movement over the scanned object is correlated with the lowering, lifting and rotation of the camera b, c and it is controlled by the controller 34 and computer software.

The invention claimed is:

1. A scanner, specifically for scanning antique books, comprising
    a housing,
    a frame,
    a camera which moves on a guide along a scanned object and which is attached to positioning mechanisms in the form of slide beams, toothed belts, gears and motors, wherein a slide bearing guide and a stepper motor are attached to a beam, wherein
    the stepper motor is connected to a transmission in the form of a gear—a toothed wheel, wherein to the opposite end of the beam a similar bearing-supported freely rotating gear is attached,
    wherein
    between said gears runs a toothed belt two ends of which are attached to a slide bearing, to which a guide and a motor are attached with a connector in-between, wherein
    the motor is linked to a screw by means of a toothed belt, wherein the screw is attached to a connector, to which slide shafts and a linear camera and a motor are also attached, wherein
    the connector houses a bearing for shaft, to one end of which the camera is attached, and to the other end of which is attached the stepped motor.

2. The scanner according to claim 1, wherein the motor is connected by means of a toothed belt to a nut installed in a gear.

3. A method of scanning antique books by moving a linear camera over a scanned book at a set speed dependent on a desired image resolution consisting of:
    movement of the linear camera along three axes,
    travelling (a) over a scanned object,
    travelling along the vertical axis (b),
    rotating around its axis (c),
    determining the movement of the linear camera by a trajectory set beforehand or during
    scanning by means of a device that determines a distance between the camera and a surface of an object, and wherein the movement is constant (t) in relation to a scanned area of the object.

4. The method according to claim 3, further consisting of
    stopping movement of the camera in scanning zones where a scan is obscured by a convex part of a page, and where guiding the camera at a right angle is impossible,
    changing movement of the camera in an opposite direction within an area of movement termination sections (VK),
    changing its scanning angle to maintain it as close to a right angle (W90) as possible,
    changing the camera movement again to opposite (VK) when ability to orient the camera perpendicularly to the scanned object is regained, and
    scanning of the second page is continued until an edge of the scanned page is reached.

* * * * *